United States Patent
Sears

(10) Patent No.: US 6,855,182 B2
(45) Date of Patent: Feb. 15, 2005

(54) LIGNOCELLULOSE FIBER COMPOSITE WITH SOIL CONDITIONERS

(75) Inventor: Karl D. Sears, Jesup, GA (US)

(73) Assignee: Rayonier Products and Financial Services Company, Fernandina Beach, FL (US)

( * ) Notice: Subject to any disclaimer, the term of this patent is extended or adjusted under 35 U.S.C. 154(b) by 174 days.

(21) Appl. No.: 10/197,205

(22) Filed: Jul. 17, 2002

(65) Prior Publication Data

US 2004/0011102 A1 Jan. 22, 2004

(51) Int. Cl.$^7$ ................................................ C05F 11/02
(52) U.S. Cl. ...................... 71/24; 71/27; 71/31; 71/54; 71/61
(58) Field of Search ............................. 71/24, 27, 31, 71/54, 61

(56) References Cited

U.S. PATENT DOCUMENTS

| | | | |
|---|---|---|---|
| 6,270,883 B1 | 8/2001 | Sears et al. | 428/292.1 |
| 6,383,609 B1 | 5/2002 | Annergren et al. | 428/178 |
| 6,395,051 B1 | 5/2002 | Arnold et al. | 71/27 |

FOREIGN PATENT DOCUMENTS

WO    WO 97/22744    6/1997

OTHER PUBLICATIONS

Seybold, C.A.; "Polyacrylamide Review: Soil Conditioning and Environmental Fate"; *Commun Soil Sci. Plant Anal.*, 25 (11 & 12), 2171–2185 (1994).

Barvenik, Frank W.; "Polyacrylamide Characteristics Related to Soil Applications"; *Soil Science*; vol. 158, No. 4, pp. 235–243; Oct. 1994.

Kirk–Othmer, "Soil Stabilization"; *Encyclopedia of Chemical Technology*; vol. 22, pp. 457–464 (1977).

*Primary Examiner*—C. Sayala
(74) *Attorney, Agent, or Firm*—Alston & Bird LLP

(57) ABSTRACT

A pellet for use in conditioning soil made of a lignocellulose fiber matrix having up to 20% by weight of a soil conditioning material incorporated therein. The soil conditioning material comprises one or more synthetic soil conditioning polymers and, optionally, additional soil enhancing additives such as fertilizers, gypsum, and calcium salts. The preferred lignocellulose materials are pulp fibers with an alpha-cellulose purity of greater than about 75% by weight, with preferred lignin content of no higher than 10%. The soil conditioning polymers are preferably polyacrylamides (PAMs) or modified PAMs, but may be a combination of other soil conditioning polymers. The pellet is produced by dispersing the polymers into a bath of lignocellulose fibers. The dispersion is then formed into pellets with a pelletizing machine such that the polymer and other soil conditioning material is interspersed within the matrix formed by the pelletized lignocellulose.

41 Claims, 1 Drawing Sheet

LIGNOCELLULOSE FIBER COMPOSITE WITH SOIL CONDITIONERS

BACKGROUND OF THE INVENTION

Figure 1:
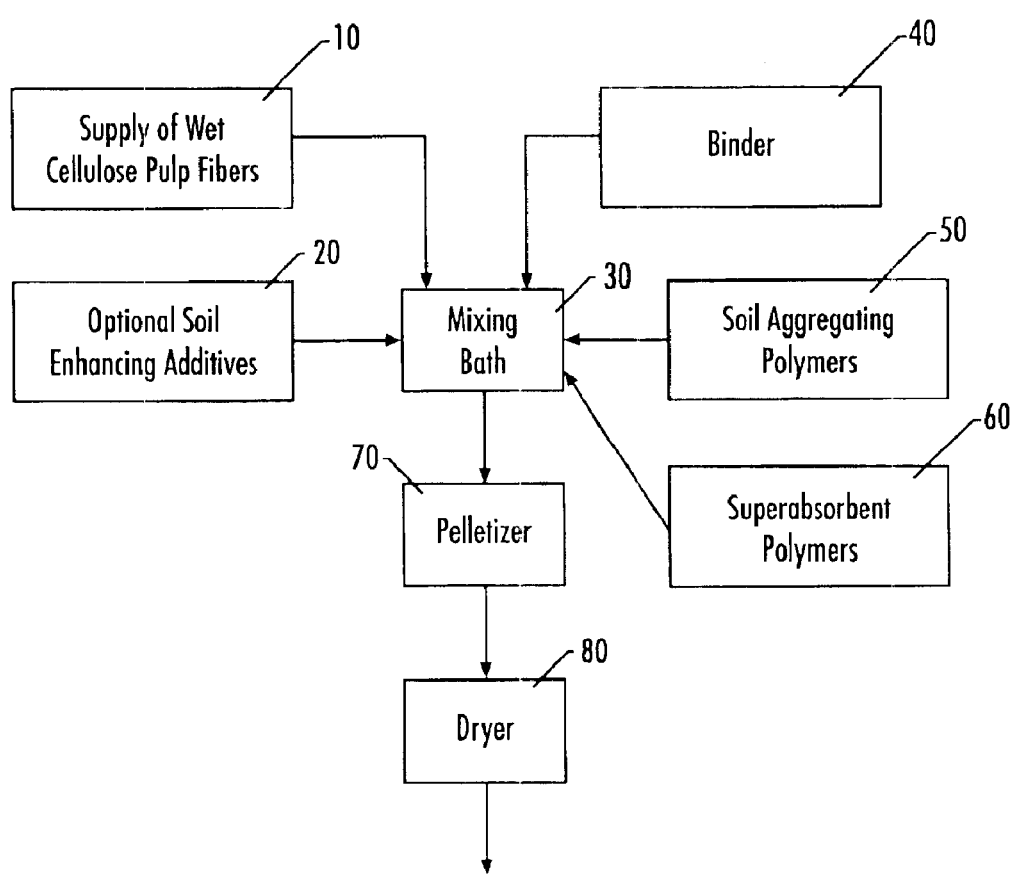

The invention is related to soil conditioning agents. Particularly, the invention relates to cellulose fiber based soil conditioning agents, particularly those which are regarded as highly effective in promoting aggregate formation, reducing soil erosion, and improving water utilization within agricultural soil. More particularly, the invention utilizes lignocellulosic fibers containing a soil conditioning agent or agents.

The effectiveness and efficiency of modern day agriculture is determined by the ability to fully utilize nutrients within the soil and the ability to maintain those nutrients within the soil over the life of a growing plant. To maintain nutrient levels within the soil, various soil conditioners are often added to the soil. The soil conditioners attempt to meet the demands of high-efficiency agriculture. Soil conditioners are also increasingly used in personal horticulture and landscaping.

The role of soil conditioners is several-fold. The conditioners must support seed germination, encourage seedling emergence, provide the efficient use of water, and prevent erosion. The most important aspect of the conditioner is the ability to increase aggregate formation (e.g., in sandy soils) which promotes water retention. Effective control of soil water controls erosion and prevents soil crusting. Erosion is controlled by encouraging absorption of water within the soil and prevention of free-flowing water over the soil surface. Soil crusting is a situation caused by the disintegration of the top layers of soil and formation of a powder-like surface layer with relatively little porosity which prevents water from penetrating through the top layer of soil. Crusting is abated by equalizing the moisture content of the soil. Water retention is aided by the addition of hydrophilic conditioning elements which hold water within the top several layers of soil and prevent the water from rapidly leaching through the soil.

One of the most effective methods of soil conditioning involves dispersing synthetic organic polymers into or onto the soil. Classes of polymers such as high molecular weight polyacrylamides, poly(ethylene glycol), poly(vinyl alcohol), copolymers of maleic anhydride, and poly(urea formaldehyde) are useful as soil conditioners. Superabsorbent polymers that are extremely hydrophilic and have the ability to absorb several times their own weight in water are also useful in improving water retention in soils. The superabsorbent polymers do not move easily through the soil, so water contained within the polymer is not allowed to leach through the soil. Rather, the water is retained, and is available to crops. As the soil dries, water is released from the polymer and also becomes available to the crops. Thus, the polymer acts as a buffer which equalizes the release of water within the soil.

Water soluble, anionic high molecular weight polyacrylamides (PAMs) are particularly useful polymeric soil conditioners in improving aggregate formation, reducing soil erosion and promoting water retention. The polymers are typically dissolved within irrigation water and applied to the soil being conditioned. They have been extensively studied by the EPA and other regulatory agencies and appear to have minimal toxicity and environmental effects.

Water insoluble but water swellable PAM superabsorbents can be produced by introduction of a significant degree of cross-linking into anionic PAMs (e.g., with methylenebisacrylamide). They are known to be quite hydrophilic with the ability to absorb 500 times their weight in water. These water retention properties have led to the utilization of PAM superabsorbents in soil system applications in horticulture, turf culture, seed coating, hydromulching and transplanting.

However, there are problems related to the use of soil conditioning polymers, such as the "PAMs". First, the anionic PAM soil conditioners are typically applied by dispersing the polymers within irrigation water. If a portion of the irrigation water flows over the soil and does not properly penetrate the soil, then the polymers within the water will likewise not be absorbed into the soil. Also, since the polymers follow the flow of irrigation water, which may or may not be uniform, the polymers are typically not well distributed within the soil. Thus, large quantities of the relatively expensive polymer may be required for proper efficacy. With regard to hydrophilic superabsorbent polymers (e.g., cross-linked anionic PAM), the superabsorbent polymers can gel together when placed on or within the soil. The gelled polymers clog the porous soil and may prevent water from penetrating the soil. Thus, improper application or use of superabsorbent polymers may be counterproductive as well.

It is desired to apply soil conditioning polymers to soil so that previously encountered problems with synthetic organic polymers may be avoided while reducing erosion and providing improved soil water control. It is desired to apply soil conditioners and superabsorbent polymers to soil such that they are well distributed throughout the targeted area of soil and readily permeate the soil without leaching through the soil.

BRIEF SUMMARY OF THE INVENTION

The invention is a composition containing synthetic soil conditioning polymers which may be applied to soil or dispersed within soil. The composition provides a medium in which the polymer may be maintained and which allows the polymer to be dispersed onto or into soil without the need for expensive irrigation equipment required in conventional methods of application. Further, the composition prevents the polymer from readily leaching through the soil to which it is applied. Still further, the medium of the composition is biodegradable and decomposes over time into a soil conditioning material.

The invention is a pellet of lignocellulose fibers having one or more synthetic soil conditioning polymers incorporated therein, and optionally containing additional soil enhancing additives such as fertilizers, gypsum, and calcium salts. The polymers and additives are collectively referred to as "soil conditioning materials". The lignocellulose pellet comprises a matrix into which the soil conditioning polymers such as anionic PAM or hydrophilic superabsorbent polymers or other materials are incorporated.

Because the fibers are pelletized and the fibers are designed to eventually degrade in soil, the lignocellulose fibers of the invention need not be of high alpha-cellulose content or low lignin content. However, the preferred lignocellulose material has an alpha-cellulose purity of greater than about 75% by weight. It is preferable that the lignin content of the preferred fiber be no higher than 10%, with the balance of bulk material being principally hemi-cellulose. The fibers may or may not be bleached. Unbleached fibers are preferred, however, since they are darker in color, hence more "soil-like" in appearance. The cellulosic pulp fibers may be of any length that is sufficient to form a pellet when compressed. Preferred average fiber lengths are between about 0.6 mm and about 3.0 mm.

The soil conditioning materials are dispersed within the lignocellulose matrix of the pellet. It is preferred that the soil conditioning materials comprise 0.1 wt % to 20 wt % of the pellet, and further preferred that a majority of the soil conditioning material comprises one or more soil conditioning polymers. The preferred polymer is polyacrylamide (PAM), which provides soil agglomerating properties when supplied in an anionic or cationic form, and which provides water absorbency when supplied in a cross-linked form. The PAM may be non-ionic, cationic, or anionic, but is preferably anionic. Anionic PAM soil conditioners are designed to be water soluble which enhances their dispersion and distribution in the soil. The PAMs may also include various degrees of cross-linking to provide water insoluble, but water swellable hydrophilic superabsorbent polymers which can be added to soil as well to enhance water retention. In place of or in combination with these modified PAM materials, other polymers having similar soil agglomerating or superabsorbent properties may also be used.

Other soil enhancing additives may be added, along with the chosen polymer, to the cellulose fiber pellet. Such additives include calcium salts, gypsum, fertilizer salts, and polysaccharides. It is preferred that the total percentage of these enhancing additives and soil conditioning polymers not exceed 20% by weight of the cellulose pellet.

Pelletizing is accomplished by using a mixing device to disperse a water soluble binder with the cellulosic fibers in an aqueous bath. The polymers and other additives may be directly added to the bath and mixed with the fibers. The soil conditioning polymers are preferably added as liquids or as fine powders to enhance dispersion within the fiber bath. Similarly, any of the optional soil enhancing additives, such as fertilizers, to be incorporated within the pellet are added at this time.

To actually form the pellet, a pelletizer, such as a Kahl™ pelletizing mill, is used to form cylindrical fiber pellets from the bath of cellulose fibers. Typical fiber pellets range from about 2 to 7 mm in diameter with a length of about 2 to 9 mm. The fiber pellets will typically have a density of around 0.5–0.8 g/cm$^3$. The pellets are preferably dried before being stored, transported, or used. The pellets may be spread or tilled into agricultural soil, or may be mixed with prepackaged soil products, such as potting soil.

The pellets of the invention are easy to spread onto or into soil because the relatively uniform size of the pellets, which can be custom designed, are conducive for use with agricultural or home lawn equipment already designed for spreading granular soil additives on or into the soil. Thus, the previously required use of expensive irrigation systems for spreading soil conditioning agents such as anionic PAMs may be avoided. Also, the pellets may be targeted to specific areas of land and tend to not be easily washed away. Further, the lignocellulose matrix degrades over time. The polymer tends to leach away with water and the lignocellulose tends to decompose in the soil, leaving products which aid the soil with nitrogen fixation and otherwise improve the overall quality of the soil.

BRIEF DESCRIPTION OF THE SEVERAL VIEWS OF THE DRAWING(S)

Having thus described the invention in general terms, reference will now be made to the accompanying drawing, which are not necessarily drawn to scale, and wherein:

FIG. 1 is a flow chart of the pellet forming process of an embodiment of the invention.

DETAILED DESCRIPTION OF THE INVENTION

The present inventions now will be described more fully hereinafter with reference to the accompanying drawing, in which one, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As mentioned, the invention is a pellet of lignocellulose fibers having a soil conditioning material incorporated therein, where the soil conditioning material comprises one or more synthetic soil conditioning polymers, and optionally, additional soil enhancing additives such as fertilizers, gypsum, and calcium salts.

Because the main purpose of the lignocellulose fiber is to provide a substrate for the polymer material and to provide a degradable medium which will decompose within the soil, the particular type of pulp fibers is not of particular importance. Lignocellulose fibers from most pulping and bleaching processes commonly used in pulp and papermaking may be used with the invention. Fibers from pulping processes including but not limited to kraft, prehydrolyzed kraft, sulfite (acid bisulfite, bisulfite, neutral sulfite), soda, thermomechanical, and chemi-thermomechanical processes may be used.

The preferred cellulosic pulp fibers are produced in kraft, prehydrolyzed kraft and acid bisulfite pulping processes and generally exhibit an alpha-cellulose purity of greater than about 75% by weight. It is preferable that the lignin content of the preferred fiber be no higher than 10%, with the balance of bulk material being principally hemi-cellulose.

The fibers may or may not be bleached. It is desirable to use unbleached fibers for several reasons. First, unbleached fibers result in a pellet having a dull brown color, similar to the color of soil, so that the fiber pellet produced by this invention would not be overly visible once dispersed into or onto a soil sample. Also, bleaching requires additional process steps which may unnecessarily use chemicals and energy resources, and is not usually needed for proper production of the pellet. Bleached fibers do have the favorable quality of being comparatively more pliable than unbleached fibers. Thus, bleached fibers may result in a more uniform pellet which tends to have a better dispersion of active chemicals therein. So, the use of bleached or unbleached fibers will depend on the desired properties of the pellet and overall process considerations.

It is preferred that the cellulose fibers be prepared from an industrial pulping or bleaching process so that the fibers are supplied in a constant and consistent manner, which in turn results in constant and consistent pellet production. Alternatively, all or a portion of the fibers may come from residual process fibers or waste fibers such as those found in pulp mill clarifier sludge. Use of such fibers does not seriously degrade or frustrate the purpose of the invention, and use of such waste fibers allows the fibers to be utilized in an end-product without the need to dispose of the fibers or further process the fibers.

Regarding the preferred lignocellulosic fibers of alpha-cellulose content of at least about 75% and appropriate coloration, exemplary lignocellulosic pulps for use in the invention include the following unbleached pulps: RAYFLOC®-J, ULTRANIER®-J, SULFATATE™-H-J, and ETHENIER™-F-UHV, which are available from Rayonier, Performance Fibers (Jesup, Ga.). All are softwood pulps with the exception of SULFATATE™-H-J which is manufactured from hardwood fibers. The use of bleached pulps is not excluded since they may sometimes yield better pellet quality, as mentioned above. In this instance, the partially bleached or fully bleached versions of each of the above fibers is also available from Rayonier.

The cellulosic pulp fibers may be derived from either a softwood pulp source or hardwood pulp source or mixtures thereof. Exemplary softwood pulp sources include trees such as various pines (Slash pine, Loblolly pine, White pine, Caribbean pine), Western hemlock, various spruces, (e.g., Sitka Spruce), Douglas fir and/or mixtures of same. Exemplary hardwood pulp sources include trees such as sweet gum, black gum, maple, oak, eucalyptus, poplar, beech, and aspen or mixtures thereof. Additionally, lignocellulosic fibers from annual plants such as bagasse, sisal, flax, hemp, and kenaf would also be suitable sources of pulp.

The cellulosic pulp fibers may be of any length that is sufficient to form a pellet when compressed. In advantageous embodiments, the cellulosic fibers are characterized by an average length of between about 0.5 mm and about 6.0 mm, and preferably between about 0.6 mm and about 3.0 mm. The average fiber length is often expressed as a weighted average fiber length ("WAFL").

Commercial cellulosic pulps are typically available as either cut sheets or sheet rolls. Both pelletization and granulation are methods to produce suitable forms of cellulose pulp fibers for use with soil conditioners, though pelletization is preferred. In order to properly pelletize or granulate cellulose pulp fibers, separate individual fibers or small aggregates of fibers are required. Separate individual fibers or small aggregates of fibers may be obtained either prior to sheeting the cellulose pulp fibers or by defiberizing sheeted material.

Granulation is generally performed using a rotary knife cutter to break up the cellulosic pulp fibers within the incoming pulp sheets or rolls. Unfortunately, the granulation process typically reduces the average fiber length, but this reduction in length does not necessarily frustrate the purpose of the invention.

In an alternative embodiment, the cellulose pulp fibers may be provided as discrete cellulosic pulp fibers or fiber bundles by capturing the fibers prior to the typical sheeting and drying operations. These discrete cellulosic pulp fibers can be efficiently formed into pellets that are easily handled in subsequent processes. Pelletizing processes preserve the fiber length, and hence mechanical properties, to a much greater extent than granulation processes. Cellulosic fibers exiting a pelletizing process typically have an average fiber length ranging between about 0.8 to 2.5 mm. The pelletizing process generally produces fiber pellets comprised of cellulosic pulp fibers that are cohesively bound by a suitable amount of at least one water soluble binder.

Referring generally to FIG. 1, a flow chart shows a preferred method of pelletizing. Pelletization may be accomplished, however, by other means known in the art. In one advantageous embodiment, a mixer, such as a Hobart mixer or a pug mill, may be used to initially disperse the water soluble binder with the cellulosic fibers. The fibers 10 are sufficiently wet (>50% moisture) to provide for well dispersed fibers in a mixing bath 30. The binder 40 for use in the invention may be selected from polyacrylamide (non-ionic), polyacrylic acid, poly(n-vinyl pyrroliddinone), sodium carboxymethyl cellulose, polyvinyl alcohol, polyethylene glycol, sodium hydroxy ethyl cellulose, sodium carboxy methyl hydroxy ethyl cellulose, sodium hydroxy propyl cellulose and mixtures thereof. Carboxymethyl cellulose is the preferred binder. The binder is preferably present in amounts of 0.2 wt % to 1 wt % by weight of the fiber.

The polymers used as the basis for the invented soil conditioning lignocellulose fiber composites are referred to herein generally as "soil conditioning polymers". Soil conditioning polymers are synthetic polymers which have either of two soil conditioning properties: they act to aggregate soil, resulting in reduced water run-off and reduced leaching of water through soil of poor quality, and/or they act to increase water retention within the soil. Thus, soil conditioning polymers may be soil aggregating polymers and/or superabsorbent polymers.

The soil conditioning polymers and other soil conditioning or enhancing additives, such as calcium salts, gypsum, fertilizer salts, and polysaccharides which may be incorporated into the pellet are generally referred to as "soil conditioning materials".

The soil aggregating polymers 50, superabsorbent polymers 60, and other enhancing additives 20 may be directly added to the bath 30 and mixed with the fibers. The soil conditioning polymers or other polymer additives are preferably added as liquids or as fine powders, in order to disperse them well in the fiber mixing bath 30. Though any weight percentage of polymer could theoretically be used with the pellet, the combined polymer contents should not exceed 20% by weight of the dried pellet in order to provide sufficient dilution effect and to maximize structural integrity of the pellet. A particularly preferred pellet composition is 5% polymer by weight of dried pellet. Favorable results may be obtained at any polymer content higher than about 0.5% by weight of dried pellet.

It is preferred that the 0.1 wt % to 20 wt % polymer dispersed within the fiber bath be PAM or modified PAM materials, although other synthetic soil conditioning polymers may be utilized as discussed below. The PAM may be selected from low or high molecular weight molecules or combinations thereof. Preferable PAM molecular weights are between $1 \times 10^5$ g/mol and $5 \times 10^7$ g/mol. The most preferred PAM polymers have molecular weights of about $1 \times 10^7$ g/mol. Additionally, the PAM may be non-ionic, cationic, or anionic. Production of such PAMs are well described in F. W. Barvenik, Soil Science, vol. 158 (no. 4), pp. 235–243 (1994). Cationic and anionic PAMs are particularly preferred for use in the invention because of their tendency to form soil aggregates. Commercially available anionic PAM for use with the invention is available from Cytec, West Paterson, N.J., as Superfloc® A-110 or Aerotil® L polymer compositions. Anionic PAMs are normally produced by copolymerization of acrylamide (AMD) and acrylic acid or a salt of acrylic acid to introduce carboxyl functionality. In preferred embodiments, the anionic PAM has about 20% carboxylate functionality.

The pellets of the invention comprising anionic PAM find wide use in sandy soils and other soils which are generally unfavorable to growth of vegetation. By aggregating available lignocellulosic fiber components and other conditioning components within the unfavorable soil, the treated soil is better able to contain water and fertilizing chemicals.

The soil conditioning polymer may also include various degrees of cross-linked PAM. Heavily cross-linked PAM is an extremely hydrophilic polymer which is not readily soluble in water. Cross-linked PAM is a "superabsorber", and is capable of absorbing roughly 500 times its own weight in water. Thus, a pellet having dispersed cross-linked PAM provides an exceptional system for holding water. When spread in or on a soil surface, the cross-linked PAM pellet acts to absorb water when water is available to the soil and to slowly release water when water is otherwise unavailable to the soil.

The modified PAMs (either anionic or cross-linked) are the preferred polymers of the invention because of their favorable soil agglomeration and erosion control features, and resulting water holding capabilities. Also, PAMs are currently used in agricultural applications, and their long term health and environmental effects have been well studied.

In place of or in combination with PAMs, other polymers having similar soil agglomerating or hydrophilic properties as the modified PAMs may be used. Polymers which may be used in conjunction with this invention include but are not limited to starch-grafted acrylonitriles, and high molecular weight poly(ethylene glycol), poly(vinyl alcohol), copolymers of maleic anhydride, and poly(urea formaldehyde). Though any combination of the described polymers may be used with the invention, it is desired that the total soil conditioning material not exceed 20% by weight of the fiber pellet.

Other soil enhancing additives 20 may be added, along with the chosen polymer, to the cellulose fiber pellet. Such additives include calcium salts, gypsum, fertilizer salts, and polysaccharides. It is appreciated that other soil additives capable of being dispersed within a pellet medium may be used with the invention. In order to maintain the integrity of the pellet and to provide for adequate dispersal of the polymer and additives within the pellet, any combination of soil conditioning polymers and enhancing additives may be used in accordance with this invention. However, the total soil conditioning material within the pellet should not be greater than 20% by weight of the pellet after drying.

To actually form the pellet, a pelletizer 70 such as a Kahl pelletizing mill, is used to form cylindrical fiber pellets from the cellulose fiber, polymer, and additives within the bath. Of course, the pellets need not be cylindrical, but may be any simple geometrical shape formed by industrial pelletizing equipment. Typical fiber pellets range from about 2 to 7 mm in diameter with a length of about 2 to 9 mm. The fiber pellets typically have a density of between about 0.4 and about 1.0 g/cm$^3$, and preferably from about 0.5–0.8 g/cm$^3$.

The pellets are preferably dried 80 before being stored or transported. Advantageously, the dried fiber pellets should have a moisture content less than about 10% by weight, such as a moisture content of less than about 5% by weight.

The resulting pellets may be spread or tilled into agricultural soil, or may be mixed with prepackaged soil products, such as potting soil. The pellets may be spread using agricultural equipment designed for spreading pelletized fertilizers. The pellets may be tilled within the soil using agricultural equipment designed to till any similar solid substance within the soil. Similarly, the pellets may be spread over turf and lawn surfaces using commonly available lawncare spreaders.

The pellets may also be incorporated into nutrient rich soil and packaged for resale. Home lawn care is a multi-million dollar industry, and planting soil having properties favorable to grass and plant growth are in heavy demand.

The invented lignocellulose pellets which contain the soil conditioning polymers, superabsorbent polymers, and/or soil enhancing additives are specially suited for spreading on land. Previous methods of dispersing soil conditioning polymers have comprised dissolving the polymers in water and spraying the dissolved polymers via irrigation systems. Irrigation technology and spraying techniques have several drawbacks. First, only polymers that can be dissolved in water are suitable for application. Second, to the extent that irrigation water does not penetrate the soil and flows over and away from the treated soil, the polymers would also be carried away from the treated soil, thereby wasting polymer. Thirdly, the very water which provides a vehicle for introducing polymer into the soil also serves as a leaching agent to undesirably drive the polymer through the soil so it is no longer effective. Finally, irrigation systems are expensive, which limits their use to land owned only by those who can afford such systems.

Pelletization of the polymer into a lignocellulose matrix serves several functions. A first advantage of the invention is that the pellets provide a convenient means to distribute the polymer. Standard pellet distribution equipment may be used to distribute the pellets. For instance, industrial agricultural equipment may be used to distribute the pellets over cropland without the need of an expensive irrigation system. Similarly, the pellets may be easily dispersed over a personal lawn with a walk behind spreader. Thus, the pellets provide a much more convenient means of application.

A second advantage of the invention is that the pellets which are physically spread over a desired area do not relocate or drift away from the treated area. Because the pellets are solid and provide a medium with significant volume, the pellets are not prone to flowing or blowing away from a treated area. In this manner, specific land areas may be targeted for treatment with little fear of wasting materials.

A third advantage of the invention is that the lignocellulose matrix slowly degrades over time. Because the lignocellulose pellet has a significant volume, it does not tend to quickly leach through the soil, as may be the case with dissolved polymers dispersed via irrigation. After the pellet has been spread into soil, the polymers in the pellet will continue to repeatedly absorb and release water, as well as provide a soil agglomeration element to the soil. Such water absorbency acts as a buffer to the soil and provides water to vegetation within the soil when water would not otherwise be available. The modified PAM soil conditioners will eventually be carried out of the lignocelluse fiber composite matrix or lose their effectiveness with time. The lignocellulose matrix will, in turn, degrade over time. The degradation products of the lignocellulose improve the humus levels of the soil and help fix nitrogen within the soil. So, both the lignocellulosic fiber and the polymers incorporated therein serve as soil conditioning agents.

EXAMPLES

Example 1

Illustration of Methodology to Prepare Fiber Pellets Containing Anionic PAM, Sample 1

Unbleached RAYFLOC®-J softwood kraft fibers in wet fibrous form (water content between 50 and 60%, based on weight of the wet fibers) are mixed in a Hobart mixer with sodium carboxymethyl cellulose ("CMC") fiber, commercially available as Na-CMC-7H4F from Hercules Aqualon Division, and 5% by dry fiber weight of Cytec™ Superfloc® A-110 anionic PAM polymer. The weight ratio of dry fiber to CMC is 100 to 0.5. After blending in a Hobart mixer, the cellulose fiber/CMC/polymer mixture is fed to a Kahl pelletizing mill to form cylindrical pellets. The Kahl Pellet Mill employed is a Type L175 mill, commercially available from Amandus Kahl Nachf., Hamburg, Germany. The pellet mill, operates at discharge rates ranging between 0.1 to 0.3 kg/min, and is utilized to produce fiber pellets with moisture contents of about 50 to 60%. The fiber pellets were subsequently dried overnight at 190° F. The process can be designed to produce fiber pellets generally with diameters ranging from about 2 to 7 mm and a length ranging from about 2 to 9 mm with final pellet density ranging from 0.5–0.8 g/cm$^3$.

Example 2

Illustration of Methodology to Prepare Fiber Pellets Containing Anionic PAM and Superabsorbent, Sample 2

A second set of fiber pellets is prepared by combining unbleached RAYFLOC®-J fibers with 0.5% carboxymethyl cellulose binder, 5 wt % Cytec™ Superfloc® A-110 polymer and 5 wt % Cytec™ Aquastore® Absorbent Polymer (all weights based on the weight of the cellulose fiber) using the mixing and pelletizing equipment and conditions described for Sample 1. Again, the process can be adjusted to obtain pellets of the appropriate dimensions, density and moisture contents prior to and after drying at 190° F.

Example 3

Illustration of Methodology to Prepare Fiber Pellets Containing Anionic PAM, Superabsorbent, and Gypsum A third set of fiber pellets is prepared by combining unbleached RAYFLOC®-J fibers with 0.5% carboxymethyl cellulose binder, 5 wt % Cytec™ Superfloc A836 polymer and 5 wt % Cytec™ Aquastore Absorbent Polymer, and 5% gypsum (all weights based on the weight of cellulose fiber) using the mixing and pelletizing equipment and conditions outlined for Samples 1 & 2. Again, the process can be adjusted to obtain pellets of the appropriate dimensions, density, and moisture contents prior to and after drying at 190° F.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A soil conditioning composite comprising
   a pelletized matrix of lignocellulose fiber and
   soil conditioning material interspersed within said matrix,
   wherein said conditioning material is between 1.0% and about 20 wt % by weight of the composite and
   wherein said soil conditioning material comprises at least one synthetic soil conditioning polymer.
2. The soil conditioning composite of claim 1, wherein the lignocellulose results from a process selected from the group consisting of kraft; prehydrolyzed kraft; sulfite, including acid bisulfite, bisulfite, and neutral sulfite; soda; thermomechanical; and chemi-thermomechanical pulping processes.
3. The soil conditioning composite of claim 2, wherein the lignocellulose fiber is produced by a pulping process selected from a kraft, prehydrolyzed kraft, and acid bisulfite process.
4. The soil conditioning composite of claim 3, wherein the lignocellulose fiber is unbleached.
5. The soil conditioning composite of claim 4, wherein the lignocellulose fiber has an alpha-cellulose content of at least 75 wt %.
6. The soil conditioning composite of claim 5, wherein the lignocellulose fiber has an lignin content of less than about 10 wt %.
7. The soil conditioning composite of claim 1, wherein the soil conditioning polymer is selected from the group consisting of polyacrylamides (PAMs), poly(ethylene glycol), poly(vinyl alcohol), copolymers of maleic anhydride, poly(urea formaldehyde), starch grafted acrylonitriles, and combinations thereof.
8. The soil conditioning composite of claim 7, wherein the soil conditioning polymer is a PAM.
9. The soil conditioning composite of claim 8, wherein the PAM is an anionic PAM.
10. The soil conditioning composite of claim 8, wherein the PAM is a superabsorbent, cross-linked PAM.
11. The soil conditioning composite of claim 8, wherein the PAM has an average molecular weight of at least $1 \times 10^5$ g/mol.
12. The soil conditioning composite of claim 9, wherein the PAM has up to about 20% carboxylate functional groups.
13. The soil conditioning composite of claim 8, wherein the PAM is up to 20 wt % of the conditioning composite by weight of the pellet.
14. The soil conditioning composite of claim 1, wherein the pellet has an average density of between about 0.4 and about 1.0 g/cm$^3$.
15. The soil conditioning composite of claim 14, wherein the pellet has an average density of between about 0.5 and about 0.8 g/cm$^3$.
16. The soil conditioning composite of claim 1, wherein the average length of the lignocellulose fiber is between about 0.5 mm and about 6.0 mm.
17. The soil conditioning composite of claim 16, wherein the average length of the lignocellulose fiber is between about 0.6 mm and 3.0 mm.
18. The soil conditioning composite of claim 1, wherein the soil conditioning material further comprises at least one water soluble binder.
19. The soil conditioning composite of claim 18, wherein the at least one binder is selected from the group consisting of polyacrylamide, polyacrylic acid, poly(n-vinyl pyrroliddinone), sodium carboxymethyl cellulose, polyvinyl alcohol, polyethylene glycol, sodium hydroxy ethyl cellulose, sodium carboxy methyl hydroxy ethyl cellulose, sodium hydroxy propyl cellulose and mixtures thereof.
20. The soil conditioning composite of claim 1, wherein the soil conditioning material further comprises a soil enhancing additive.
21. The soil conditioning composite of claim 20, wherein the enhancing additive is selected from the group consisting of calcium salts, gypsum, fertilizer salts, and polysaccharides.
22. A method of forming a soil conditioning pellet comprising:
   mixing water, lignocellulose fibers, at least one soil conditioning polymer, and a binder into a mixture;
   forming pellets from portions of the mixture with a pelletizer; and
   drying the pellets to an average density of between about 4.0 and about 1.0 g/cm$^3$.
23. The method of claim 22, wherein the lignocellulose fiber has an alpha-cellulose content of at least 75 wt %.

24. The method of claim 23, wherein the lignocellulose fiber has a lignin content of less than about 10 wt % of the fiber.

25. The method of claim 22, wherein the soil conditioning polymer is selected from the group consisting of polyacrylamides (PAMs), poly(ethylene glycol), poly(vinyl alcohol), copolymers of maleic anhydride, poly(urea formaldehyde), starch grafted acrylonitriles and combinations thereof.

26. The method of claim 25, wherein the polymer is a PAM.

27. The method of claim 26, wherein the PAM is an anionic PAM.

28. The method of claim 26, wherein the PAM is a superabsorbent, cross-linked PAM.

29. The method of claim 26, wherein the PAM has an average molecular weight of at least $1 \times 10^5$ g/mol.

30. The method of claim 26, wherein the PAM is up to 20 wt % by weight of the pellet.

31. The method of claim 22, wherein the pellet is formed with an average density of between about 0.5 and about 0.8 g/cm$^3$.

32. The method of claim 22, further comprising the step of mixing a soil enhancing additive selected from the group consisting of calcium salts, gypsum, fertilizer salts, and polysaccharides into said mixture prior to pelletizing.

33. A soil conditioning pellet formed by the method of claim 22.

34. A method of forming a soil conditioning pellet comprising:

mixing water, lignocellulose fibers, at least one polyacrylamide (PAM) soil conditioning polymer, and a binder into a mixture;

forming pellets from portions of the mixture with a pelletizer; and drying the pellets.

35. The method of claim 34, wherein the PAM is an anionic PAM.

36. The method of claim 34, wherein the PAM is a superabsorbent, cross-linked PAM.

37. The method of claim 34, wherein the PAM has an average molecular weight of at least $1 \times 10^5$ g/mol.

38. The method of claim 34, wherein the PAM is up to 20 wt % by weight of the pellet.

39. A soil conditioning pellet formed by the method of claim 34.

40. A method of forming a soil conditioning pellet comprising:

mixing water, lignocellulose fibers, at least one soil conditioning polymer, a binder, and a soil enhancing additive selected from the group consisting of calcium salts, gypsum, fertilizer salts, and polysaccharides into a mixture;

forming pellets from portions of the mixture with a pelletizer; and drying the pellets.

41. A soil conditioning pellet formed by the method of claim 40.

* * * * *